(12) United States Patent
Mohrmann et al.

(10) Patent No.: US 10,449,917 B2
(45) Date of Patent: Oct. 22, 2019

(54) ON-BOARD VEHICLE ELECTRICAL SYSTEM HAVING A CONVERTER AND HIGH-LOAD CONSUMER

(71) Applicant: Ford Global Technologies, LLC, Dearborn, MI (US)

(72) Inventors: Bjoern Mohrmann, Aachen NRW (DE); Peter Schmitz, Aachen NRW (DE); Armin Warm, Aachen NRW (DE); Manuel Bojahr, Aachen NRW (DE); Engbert Spijker, Nuth (NL); Mark Eifert, Hessen (DE)

(73) Assignee: Ford Global Technologies, LLC, Dearborn, MI (US)

( * ) Notice: Subject to any disclaimer, the term of this patent is extended or adjusted under 35 U.S.C. 154(b) by 78 days.

(21) Appl. No.: 15/664,391

(22) Filed: Jul. 31, 2017

(65) Prior Publication Data
US 2018/0029546 A1    Feb. 1, 2018

(30) Foreign Application Priority Data

Jul. 29, 2016    (DE) .................. 10 2016 213 977

(51) Int. Cl.
*B60R 16/033*    (2006.01)
*B60N 2/02*    (2006.01)
(Continued)

(52) U.S. Cl.
CPC .......... *B60R 16/033* (2013.01); *B60N 2/0232* (2013.01); *B60R 16/037* (2013.01); *H02J 1/08* (2013.01); *H02J 1/102* (2013.01); *H02J 7/14* (2013.01); *H02J 7/1438* (2013.01); *H02J 7/345* (2013.01); *Y02T 10/7005* (2013.01)

(58) Field of Classification Search
CPC ..... B60R 16/03; B60R 16/033; B60R 16/037; H02J 7/00; H02J 7/14; H02J 7/16
USPC ..... 307/10.1, 9.1, 10.7, 10.2, 66, 64, 82, 80; 320/108, 109, 119, 149
See application file for complete search history.

(56) References Cited

U.S. PATENT DOCUMENTS 5,179,508 A    1/1993    Lange et al.
8,659,279 B2    2/2014    George et al.
(Continued)

FOREIGN PATENT DOCUMENTS

DE    10248658 A1    5/2004
DE    10392456 T5    6/2005
(Continued)

*Primary Examiner* — Fritz M Fleming
*Assistant Examiner* — Jagdeep S Dhillon
(74) *Attorney, Agent, or Firm* — Frank Lollo; Brooks Kushman P.C.

(57) ABSTRACT

An on-board electrical system for motor vehicles has a battery, a generator and at least one normal consumer that is connected to the battery in a switchable manner. A DC voltage/DC voltage converter is connected on its primary side to the battery and on its secondary side to a high-load resistor. A switch connects the high-load consumer to a storage device in a first switching position, and to the primary side in a second switching position. A controller controls and operates the switch between the first and the second switching position. A device that detects the actual electrical power of the high-load consumer is associated with the high-load consumer, and is connected at the output end to the controller.

10 Claims, 3 Drawing Sheets

(51) Int. Cl.
  *B60R 16/037*  (2006.01)
  *H02J 7/14*  (2006.01)
  *H02J 1/08*  (2006.01)
  *H02J 1/10*  (2006.01)
  *H02J 7/34*  (2006.01)

(56) References Cited

U.S. PATENT DOCUMENTS

| | | | |
|---|---|---|---|
| 8,754,545 B2* | 6/2014 | Wai | H02J 7/34 |
| | | | 307/66 |
| 8,860,359 B2 | 10/2014 | Cao et al. | |
| 8,971,073 B2 | 3/2015 | Grant et al. | |
| 2012/0261982 A1 | 10/2012 | Wanke et al. | |
| 2012/0296506 A1* | 11/2012 | Kotani | H02J 1/00 |
| | | | 701/22 |
| 2013/0110334 A1* | 5/2013 | Asami | B60L 11/1803 |
| | | | 701/22 |
| 2013/0229752 A1* | 9/2013 | Takahashi | H01H 85/20 |
| | | | 361/642 |
| 2014/0084817 A1 | 3/2014 | Bhavaraju et al. | |
| 2014/0265559 A1 | 9/2014 | Leehey et al. | |
| 2015/0336461 A1 | 11/2015 | Decoster et al. | |
| 2016/0159296 A1* | 6/2016 | Mijac | B60R 16/03 |
| | | | 307/9.1 |
| 2016/0185237 A1* | 6/2016 | Ha | B60L 11/1803 |
| | | | 318/139 |
| 2017/0113637 A1* | 4/2017 | Mueller | B60R 16/03 |
| 2017/0267105 A1* | 9/2017 | Fratelli | H02J 7/345 |

FOREIGN PATENT DOCUMENTS

| | | |
|---|---|---|
| DE | 102007029025 A1 | 6/2007 |
| DE | 102012005993 A1 | 11/2012 |
| DE | 102012206932 A1 | 10/2013 |

* cited by examiner

ON-BOARD VEHICLE ELECTRICAL SYSTEM HAVING A CONVERTER AND HIGH-LOAD CONSUMER

CROSS-REFERENCE TO RELATED APPLICATIONS

This application claims foreign priority benefits under 35 U.S.C. § 119(a)-(d) to DE Application 10 2016 213 977.0 filed Jul. 29, 2016, which is hereby incorporated by reference in its entirety.

TECHNICAL FIELD

The disclosure relates to an on-board electrical system for motor vehicles and to a method for operating an on-board electrical system.

BACKGROUND

US 2014/0084 817 A1 discloses a method for energy and power management in dynamic systems comprising supercapacitors. Here, the sum of the voltage of a battery and of the supercapacitor is applied to a consumer in a first switching state. In the normal load state, the secondary side of the DC voltage/DC voltage converter is connected to the consumer.

US 2012/0261 982 A1 discloses an on-board multivoltage electrical system for a motor vehicle. A plurality of DC voltage/DC voltage converters are used, capacitors being associated with said plurality of DC voltage/DC voltage converters. Different operating states can be achieved by means of a toggle switch.

US 2014/026 559 A1 discloses a high-power, on-board electrical system for a motor vehicle. Said high-power, on-board electrical system has a high-power electrical bus, which is at least partially supplied with power by a converter that obtains its input power from the battery of the vehicle. The high-power electrical bus can be at least partially uncoupled from the motor vehicle battery. Consumers with a high electrical power, such as an active wheel suspension, or an active chassis, or an active suspension, for example, are supplied with power by means of the high-power electrical bus.

A consumer with a high electrical power typically has a maximum power consumption of >1 kW or current consumption of >80 A, and an average power consumption of 300 W or current consumption of 25 A.

U.S. Pat. No. 8,971,073 B2 discloses a system and a method for bridging (bypassing) multistage DC voltage/DC voltage converters in networks with batteries. No capacitors are used.

U.S. Pat. No. 5,179,508 discloses a voltage supply system comprising a battery and a DC voltage/DC voltage converter. Said DC voltage/DC voltage converter is always in the power flow, it is not bridged.

SUMMARY

The object of the disclosure is to further develop an on-board electrical system and, in particular, to design said on-board electrical system in such a way that a DC voltage/DC voltage converter can be bridged when the power requirement of a high-power consumer is low (for example less than 40% to 60% of the rated power of the DC voltage/DC voltage converter) and/or constant (for example fluctuation in the current value of less than 10% of the rated value of the power of the high-power consumer). However, the high-power consumer is intended to be supplied with power via the converter when the power requirement of the high-power consumer is high or changes rapidly (for example fluctuation in the current value of greater than 10% of the rated value of the power of the high-power consumer within one second).

Owing to the disclosure, the energy efficiency of the system is increased when the DC voltage/DC voltage converter is bridged. Converters of small size can be used, for example a converter for 210 W can be used instead of a converter with a 300 W rated power. Continuous loading and continuous incidence of heat loss in the converter do not take place. The converter is used only in relatively short phases of high-power requirement, and heat loss arises only in said phases. This is advantageous; energy, in particular fuel, is saved.

Example "power supply to a chassis actuator": maximum required power in the dynamic mode (highly fluctuating load, for example slalom): 210 W, maximum required power in the constant mode (constant load, for example traveling around a long bend): 300 W. That is to say, the DC/DC converter, instead of being designed for traveling around a bend, can be reduced in size to match the design of the slalom since the DC/DC converter can be bridged when traveling around a long bend.

The actual power requirement of the high-power consumer is detected by the device that detects the power. This device can detect, for example, the current which flows through the high-power consumer. It is then assumed that the voltage is known, for example is battery voltage, and it is then possible to calculate the power by multiplication. However, it is also possible to detect the power by means of measuring current and voltage. It is also possible to detect the voltage applied to the consumer, and, therefore, calculate the actual voltage drop which, in turn, allows the current and accordingly the power to be calculated.

On account of the device for detecting the power, it is possible to generate a control signal, which is fed to the controller, also called control circuit. If the actually measured power is lower than the threshold value, the switch is moved to the first switching position or held in said first switching position. However, if the power is higher, the switch is held in the second switching position or moved to said second switching position. If a rapidly changing power is detected, for example the current value fluctuates by more than 10% of the nominal value of the power of the high-power consumer within one second, the second switching position is likewise selected.

The degree of efficiency of a DC/DC converter changes depending on its output power and output voltage. When a DC/DC converter is used for a load or for a set of loads with different power requirements or levels, said DC/DC converter may always operate in an operating range with a low degree of efficiency. As a solution, a DC/DC converter can be bridged or disconnected when it is operated in a range with a low degree of efficiency. In this case, the loads that are intended to be supplied with power are directly supplied with power by a more suitable DC/DC converter with a higher degree of efficiency, or by the primary electrical power source. The primary source can be formed from a generator and battery, or it can likewise be a DC/DC converter. This is often the case in hybrid vehicles. The outputs of the DC/DC converters can be connected to a large capacitor, or to a bank of ultracapacitors, or to an auxiliary battery.

One problem with switching over from a load to a plurality of power supply sources is that the load experiences voltage jumps, which can have a negative influence on the functioning of said load. Solutions to this problem are also part of the concept. The voltages of the sources can first be balanced, before the switching process takes place, or a method for removing power sources by parallel interconnection and adjusting the output voltages can be used.

An architecture with preferably a plurality of DC/DC converters or power sources, a strategy for selecting the most suitable source depending on its degree of efficiency, and a control strategy that allows transition between sources without disruptive changes in voltage are proposed. The concept is suitable for an application in vehicles with conventional drives, hybrid drives and electric drives. Said concept can also be used for on-board electrical systems in aircraft and ships.

The switch is preferably a changeover switch; it has at least one switching tongue that is connected to the high-load consumer. Said switch has a first switching contact, which is connected to the secondary side of the converter, and a second switching contact which is connected to the primary side of the converter. Preferably, either two switching tongues are provided, so that both poles of the secondary side and of the primary side can be switched, or in each case one pole of the primary side and one pole of the secondary side are connected to one another; this connection is expediently connected to ground. In the latter case, only one toggle switch with one switching tongue is required.

In the method for controlling an on-board electrical system, as has been described above as such, the power requirement of the high-power consumer is continuously ascertained or ascertained at short time intervals (sampling) by means of a device for detecting the power, and the signal that is obtained in this way and relates to the actual power requirement of the high-power consumer is fed to the controller. A threshold value is defined in the controller. If this threshold value is undershot, that is to say if the actual power requirement is lower than the threshold value, the controller operates the switch to the first switching position in which the converter is bridged. If, however, the power requirement is higher than the threshold value, the control system operates the switch to the second switching position. This is also the case when the power requirement of the high-power consumer fluctuates in short time periods, for example fluctuates by more than 10% of its rated power multiple times within one second.

Further features and advantages of the disclosure can be gathered from the further claims and also from the description to follow of an exemplary embodiment of the disclosure which is not intended to be understood to be restrictive and will be explained in more detail with reference to the drawing, in which:

DETAILED DESCRIPTION

As required, detailed embodiments of the present disclosure are disclosed herein; however, it is to be understood that the disclosed embodiments are merely exemplary of the disclosure that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure.

Figure 1:
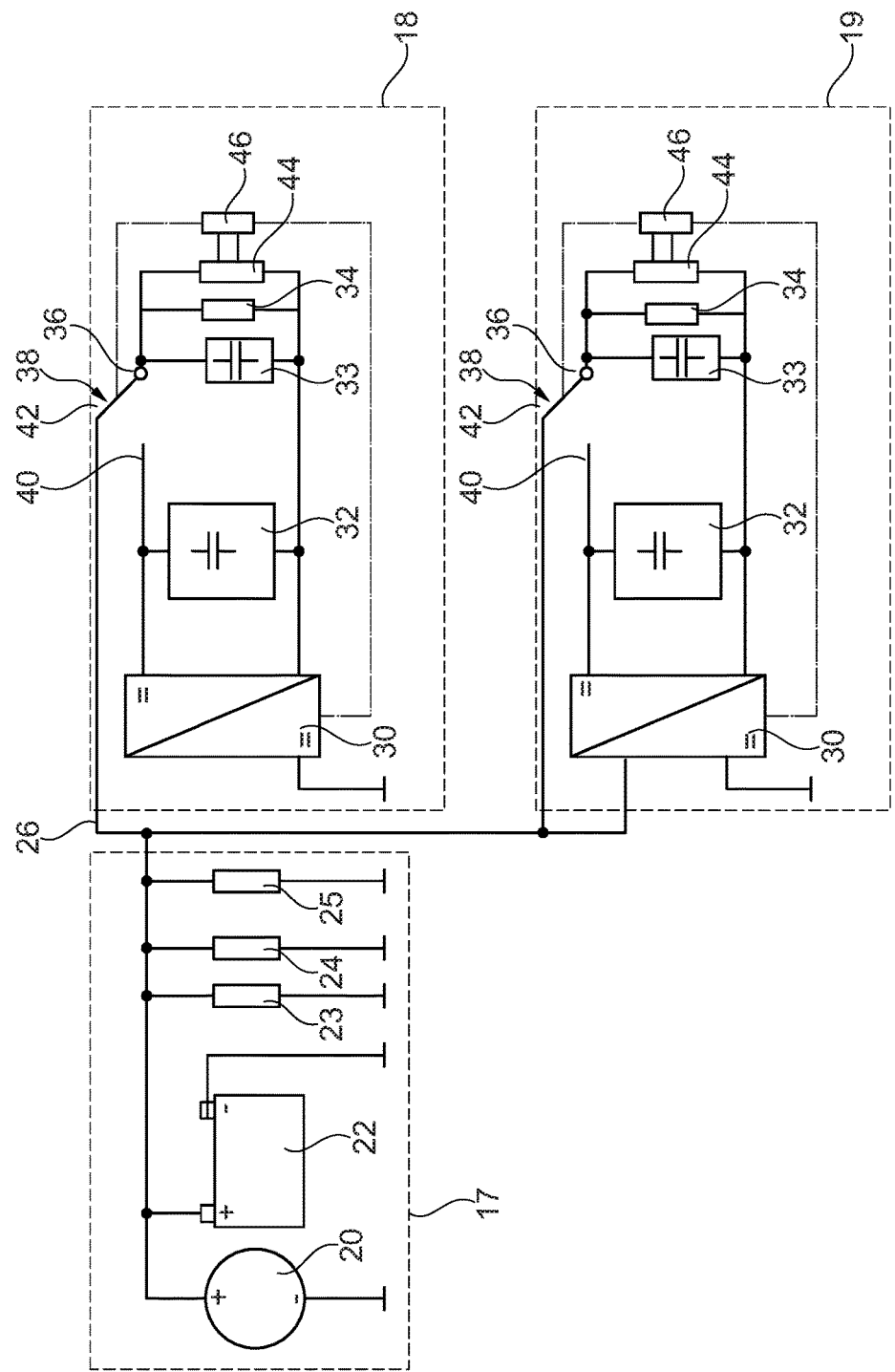
FIG. 1 shows an electrical circuit diagram of a battery-assisted on-board electrical system with normal consumers that has two subsystems, each having one converter and one high-power consumer.

FIG. 1 shows an electrical circuit divided into three regions 17, 18 and 19. There is a generator 20 and a battery 22 in a first region 17, which is also called the primary region and distribution network. The generator 20 is connected in parallel with the battery 22. The customary devices, such as a regulator between generator 20 and battery 22, are known to a person skilled in the art; a regulator of this kind is not illustrated here for reasons of simplicity. Said regulator of this kind ensures that a connection to the battery 22 and charging of said battery take place only when the generator 22 is operated at a sufficient rotation speed. Three further normal consumers 23 to 25 are provided in the primary region 17. They can be connected and disconnected by means of switches, not illustrated. These consumers 23 to 25 are, for example, windshield wiper motors, light sources, electric motors for seat adjustment and the like.

The primary region 17 is connected to the regions 18 and 19, and specifically connected to an upper subsystem and a lower subsystem, via a connecting line 26 that is applied to positive potential. The regions 18 and 19 are physically identical. Therefore, only the upper subsystem is described in the text that follows. A DC voltage/DC voltage converter 30, also called DC/DC converter, or converter 30, is arranged in said subsystem. The converter has a primary side with two connection poles. The primary side is on the left, and a secondary side having two connection poles is on the right. The rated power of the DC voltage/DC voltage converter 30 is, for example, 300 W. A lower pole of the primary side and a lower pole of the secondary side are connected to one another, and, in addition, connected to ground potential to which the negative pole of the battery 22 is also applied here.

The primary side is connected in parallel with the battery 22. A storage device 32, here a supercapacitor in particular, is connected in parallel with the secondary side. A normal battery 22 can also be used. The advantage of a supercapacitor is rapid charging and relatively low losses. Furthermore, there is a high-power consumer 34, also called high-load consumer, in the subsystem 18. Here, said high-power consumer 34 is, for example, a high-power electric motor as is used for active chassis. Said high-power electric motor is connected to ground by way of a connection, and to a switching tongue 36 of a switch 38 by way of its other connection. Said switch has a first, lower switching contact 40 that is connected to the upper pole of the secondary side and of the storage means 32. Said switch 38 additionally has a second, upper switching contact 42 that is connected to the connecting line 26, that is to say to the upper pole of the primary side.

A device 44 that detects power is associated with the high-power consumer 34. Said device 44 detects the actual power requirement of the high-power consumer 34. This can be performed, for example, by the current flowing through the consumer 34 being detected, and assuming from the current that the voltage corresponds substantially to the known average output voltage of the converter 30 or the battery 22, that is to say is 12 V for example, as is indicated here. The actual power can then be calculated by multiplication. However, in addition, the voltage, which is actually applied to the high-power consumer 34, can also be measured, so that improved power detection is possible. However, it is also possible to estimate, using only one voltage measurement, the current actually flowing through the high-power consumer 34 since the voltage actually applied to the high-power consumer 34 depends on the level of the current flowing through said high-power consumer 34.

A further energy store 33, for example a capacitor module, can also be provided in parallel with the high-power consumer 34, either in addition to or instead of the energy store 32.

Furthermore, a controller 46 is provided in the subsystem 26. Said control circuit has the task of controlling the switching position of the switching tongue 36 (see dashed line). Said control circuit receives its input signal from the device 44 that detects power. A threshold value for the power is prespecified in the controller 46. Furthermore, the controller 46 detects a change in the power over time, for example by checking the actual power values (sampling) in certain, short time intervals. As long as the power requirement is below the threshold value, the first switching position is selected. Here, the converter 30 is bridged, or bypassed. However, if the actual power requirement of the high-power consumer 34 is above the threshold value, the controller 46 operates the switch 38 to, or it leaves it in, the second, lower switching position. In this case the switching tongue 36 is connected, or remains connected, to the secondary side of the converter and to the storage means 32.

The controller 46 decides which electrical power source supplies power to a load. The power sources are either the battery 22, the generator 20 or a DC/DC converter 30. Each can be selectively, permanently connected to a large capacitor, ultracapacitor or battery at the output.

Two criteria are used by the controller 46 in order to decide which power source to select for supplying power to a consumer:

a. The decision is made to select the source with the highest degree of efficiency for the required power if this source is sufficiently dimensioned to supply the required power peaks.

b. If a consumer requires high power peaks, the controller 46 can select a source which can supply such peaks with a greater degree of probability. For example: a generator and conventional lead-acid battery cannot always supply high peak currents, but a power source which is made up of a DC/DC converter and an ultracapacitor can supply high peak currents more effectively and more reliably. Therefore, a source of this kind is selected when certain consumers are activated.

If the power that is called up by the high-power consumer 34 changes in short time intervals, for example varies twice and, in particular, more frequently by more than 10% of the rated power of the high-power consumer 34 within one second, a switching position 2 is also selected. The consumer is preferably shut-off in response to the power changing twice and, in particular, more frequently by more than 10% of the rated power of the high-power consumer 34 within half a second or one tenth of a second.

Particularly in the case of a hybrid vehicle, it is possible to have a plurality of DC/DC converters as the primary power source. This is the case, for example, when the vehicle is a plug-in hybrid or BEV, and the low-voltage supply system is supplied by the domestic supply system (plug socket) or by a drive system. In this case, the controller 46 selects the source with the highest degree of efficiency for the required power.

The required power can be calculated by measured voltage and current. It can also be identified with a feed-forward approach. In this case, the controller 46 monitors the activation of one or more consumers 34. If a consumer 34 is activated, its load, which is already known and stored, is used to decide which electrical power source is the most suitable. This method has the advantages that it does not require any additional sensors and no time is required in order to calculate the power. One or more power sources are selected depending on the decision made by the controller 46. Depending on the selected realization of the concept, this is done by bridging using a mechanical or semiconductor switch or by raising the output voltage of a selected source when the sources are connected in parallel, as illustrated above. When a source is selected in this way, it is likewise possible to lower the output voltages of the remaining sources.

If a source is selected by bridging one or more sources using a mechanical or semiconductor switch, the output voltage can be preset, so that the load undergoes a minimal change or no change in the supply voltage. The output voltage of the old sources can likewise be set, so that the transition runs smoothly. After the transition has taken place, the output voltage of the selected source can be regulated to an optimum voltage. This voltage can be selected to be optimal in respect of degree of efficiency, service life of electrical consumers or other criteria. When regulating the voltage, the voltage/time gradient should be selected as far as possible such that the functions of the consumers are not adversely affected. After the transition has taken place, a power source that would be bridged can be completely disconnected in order to avoid losses due to low-load power.

The disclosure enables electrical energy to be recovered when the high-power consumer 34 is mechanically moved by external forces and acts as a generator. This is the case when said consumer is in the form of an electric motor for example. In an active chassis, the electric motors, which are responsible for adjusting chassis components, are also subjected to the action of repelling forces that are usually exerted by the road and shift the electric motors, which leads to electrical power being generated. Depending on the switching position, this energy is supplied to the battery 22 of the vehicle or to the storage device 32. Recuperation takes place in this way.

The on-board electrical system for motor vehicles has a battery 22, a generator 20 and at least one normal consumer 23-25 that is connected to the battery 22 in a switchable manner. A DC voltage/DC voltage converter 30 is connected on its primary side to the battery 22 and on its secondary side to a high-load resistor 34, for example a high-power actuator, so as to form an electrical subsystem with a storage device 32, and such that it can be switched via a switch 38. The switch 38 connects the high-load consumer 34 to the storage means 32 in a first switching position, and to the primary side in a second switching position. The controller 46 controls and operates the switching position of the switch 38 between the first and the second switching position. A device for detecting the actual electrical power 44 of the high-load consumer 34 is associated with the high-load consumer 34, and is connected at the output end to the controller 46.

Figure 2:
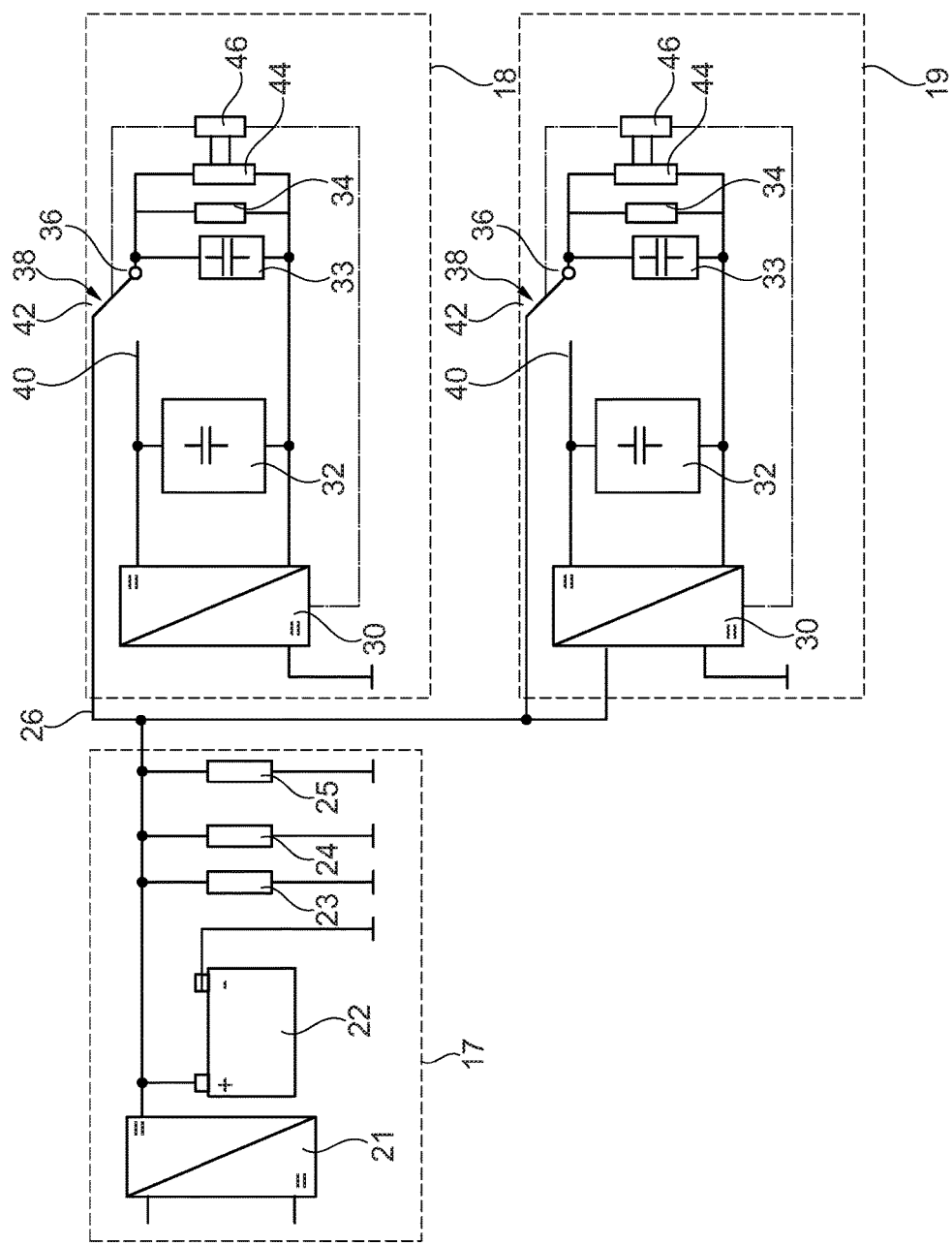
FIG. 2 shows the circuit diagram as in FIG. 1, but now with a different electrical energy source.

FIG. 2 corresponds to FIG. 1 with the following exception: instead of supplying power to the 12 V on-board electrical system via the generator 20, power is now supplied via a DC/DC converter 21, as is the case in hybrid and electric vehicles for example.

When a DC/DC converter 30 is bridged or decoupled, the loads to which it supplies power always have to be supplied with power by a second DC/DC converter 21, or by the primary electrical power source. As described above, the primary source can be formed from a generator and battery, or it can be a DC/DC converter that is supplied with power by the high-voltage system. There are two fundamental methods of removing a DC/DC converter from the power supply in order to improve the degree of efficiency of the entire system or vehicle.

As illustrated in FIGS. 1 and 2, a DC/DC converter 21 can be removed from the supply using a conventional switch. In this case, said DC/DC converter 30 should preferably completely switched off in order to avoid no-load losses. Either the primary electrical power source or a second DC/DC converter 21 will take over the supply of power in this case. In order to avoid the load being subject to voltage fluctuations when a DC/DC converter 30 is removed, the new DC/DC converter 21 or the primary power source is preferably controlled such that the voltage across the load remains constant when the transition takes place. If the primary power source is controlled in this way, it is controlled as slowly as possible to the new voltage in order to avoid the rest of the consumers being subject to voltage fluctuations. If the primary power source takes over the supply of power, it can then be slowly regulated back to its original voltage.

FIGS. 1 and 2 show conventional switches that bridge a DC/DC converter 30. Bipolar transistors or MOSFETs can likewise be used as switches when a DC/DC converter 30 is bridged in this way.

Figure 3:
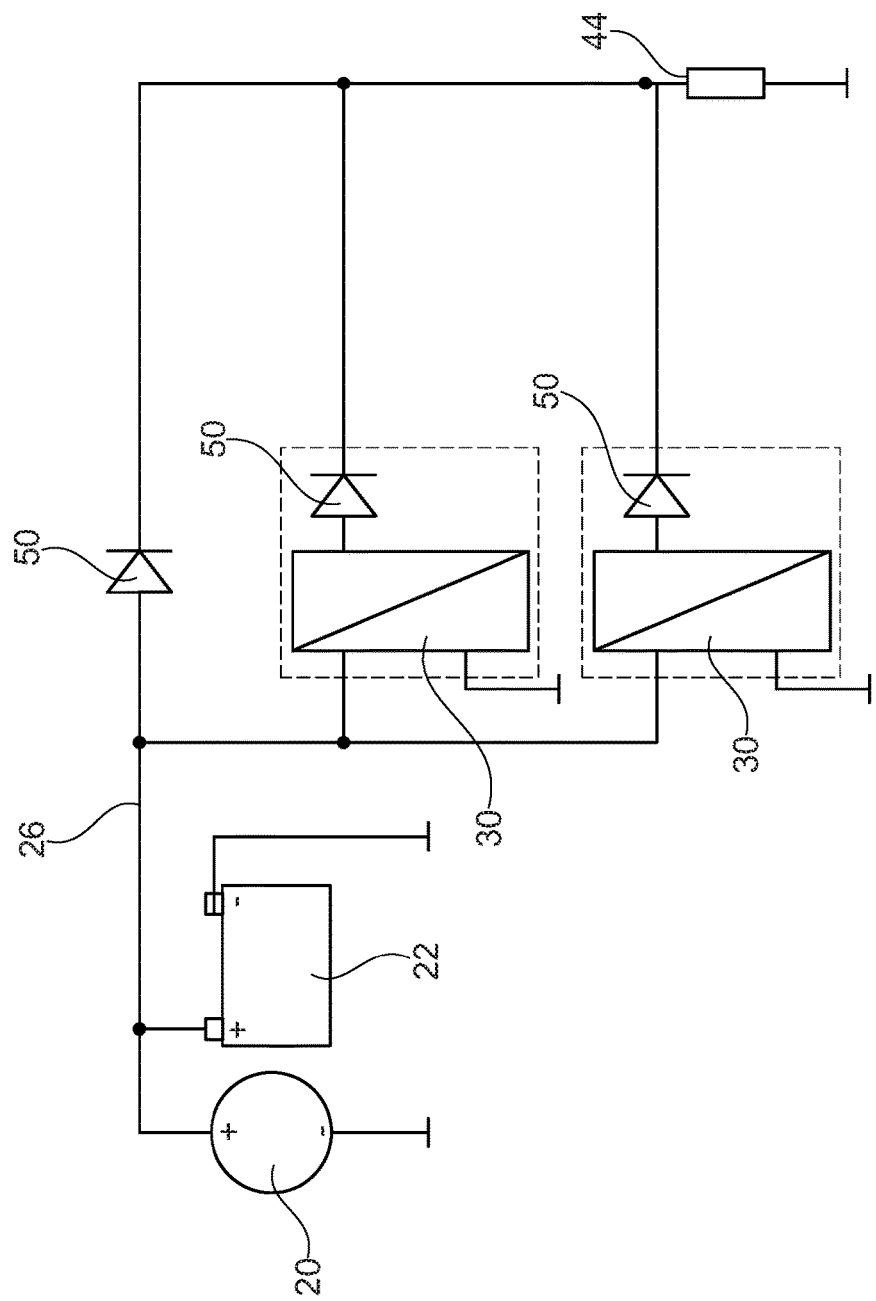
FIG. 3 shows a basic illustration of a circuit as in FIG. 1 or 2 for bridging by voltage regulation operations.

FIG. 3 shows a method for actively removing a DC/DC converter 30 from the power supply. Two different electrical power sources, the converters 30 (at the top) and 30 (at the bottom) are connected in parallel. The output voltages of these converters 30 are set as described above and take into account the following considerations:

Each DC/DC converter 30 has a diode 50, which is connected to one of its two output poles and prevents current flowing into the DC/DC converter 30 when the voltage of the primary electrical power source or the output voltage of a second DC/DC converter 21 is greater than its own output voltage. In this case, a DC/DC converter 30 is removed from the power supply when the output voltage of the primary source or the output voltage of a second DC/DC converter 21 is greater than its output voltage. In this case, a converter 30 is effectively taken from the power supply as if it is connected to the load by way of a switch. This method has the following advantage: when the selected source (primary source or second DC/DC converter) is saturated (reaches its maximum power), the output voltage automatically drops. In this case, the remaining source takes over the supply of power to the load, without there being an interruption in the power supply or a rapid change in the voltage across the load.

What is claimed is:

1. A vehicle electrical system comprising:
   a voltage converter having a primary side connected to a battery and a secondary side connected to a high-load consumer and a storage device;
   a switch between the storage device and the high-load consumer that connects the high-load consumer to the storage device and the secondary side in a first switching position, and that connects the high-load consumer to the primary side in a second switching position;
   a device connected at an output end of the controller configured to detect electrical power of the high-load consumer; and
   a controller that positions the switch in the first position when a power requirement of the high-load consumer is less than a predefined percentage of a rated power of the high-load consumer, and positions the switch in the second position when the power requirement is greater than the predefined percentage of the rated power of the high-load consumer.

2. The vehicle electrical system as claimed in claim 1, wherein the switch has a switching tongue connected to the high-load consumer, the switch having a first, lower switching contact connected to the storage device and to an upper pole of the secondary side, and a second, upper switching contact connected to an upper pole of the primary side.

3. The vehicle electrical system as claimed in claim 1, wherein one of two connections of the primary side is connected to one of two connections of the secondary side of the converter to connect to ground.

4. The vehicle electrical system as claimed in claim 1, wherein the predefined percentage is in a range of 40% to 60% of the rated power.

5. The vehicle electrical system as claimed in claim 1, wherein the controller further positions the switch in the second position when a power requirement of the high-load consumer changes twice by more than 10% of a rated power of the high-load consumer within one second.

6. A vehicle comprising:
   a generator to charge a battery;
   a voltage converter having a primary side connected to the battery and a secondary side connected to a high-load consumer and a storage device;
   a switch between the storage device and the high-load consumer that connects the high-load consumer to the storage device and the secondary side in a first switching position, and that connects the high-load consumer to the primary side in a second switching position;
   a controller configured to operate the switch between the first and second switching positions; and
   a device that detects electrical power of the high-load consumer, wherein the device is connected at an output end to the controller.

7. The vehicle as claimed in claim 6, Wherein the switch has a first, tower switching contact connected to the storage device and to an upper pole of the secondary side, and a second, upper switching contact connected to an upper pole of the primary side.

8. The vehicle as claimed in claim 6, Wherein one of two connections of the primary side is connected to one of two connections of the secondary side of the voltage converter to connect to ground.

9. The vehicle as claimed in claim 6, wherein the controller is configured to position the switch in the first switching position when a power requirement of the high-load consumer is less than a predefined percentage of a rated power of the high-load consumer, and position the switch in the second switching position when the power requirement is greater than the predefined percentage of the rated power of the high-load consumer, the predefined percentage being in a range of 40% to 60% of the rated power.

10. The vehicle as claimed in claim 6, wherein the controller is configured to position the switch in the second switching position when a power requirement of the high-load consumer changes twice by more than 10% of a rated power of the high-load consumer within one second.

* * * * *